(12) United States Patent
Loyley et al.

(10) Patent No.: US 11,793,273 B2
(45) Date of Patent: Oct. 24, 2023

(54) FIBER-FOAM SHOE INSOLES, AND A METHOD OF MANUFACTURING THE SAME

(71) Applicant: O2 Partners, LLC, Amherst, MA (US)

(72) Inventors: Daniel Loyley, Brabant Wallon (BE); Robert Falken, Solana Beach, CA (US); Fabio Zanotto, Amherst, CA (US)

(73) Assignee: O2 Partners, LLC, Amherst, MA (US)

( * ) Notice: Subject to any disclaimer, the term of this patent is extended or adjusted under 35 U.S.C. 154(b) by 0 days.

(21) Appl. No.: 17/835,667

(22) Filed: Jun. 8, 2022

(65) Prior Publication Data

US 2022/0295942 A1  Sep. 22, 2022

Related U.S. Application Data

(63) Continuation of application No. 16/920,167, filed on Jul. 2, 2020, now Pat. No. 11,395,525.

(Continued)

(51) Int. Cl.
  *A43B 17/14* (2006.01)
  *B32B 7/12* (2006.01)
  (Continued)

(52) U.S. Cl.
  CPC ............. *A43B 17/14* (2013.01); *B32B 5/022* (2013.01); *B32B 5/245* (2013.01); *B32B 7/12* (2013.01); *B32B 37/12* (2013.01); *B32B 38/0004* (2013.01); *B32B 2262/0276* (2013.01); *B32B 2262/103* (2013.01); *B32B 2266/0221* (2013.01); *B32B 2266/0278* (2013.01); *B32B 2266/06* (2013.01); *B32B 2266/08* (2013.01);
  (Continued)

(58) Field of Classification Search
  None
  See application file for complete search history.

(56) References Cited

U.S. PATENT DOCUMENTS 5,233,769 A    8/1993   Weber
5,261,169 A    11/1993   Williford
(Continued)

FOREIGN PATENT DOCUMENTS

| DE | 297 01 276 U1 | 4/1997 | |
|---|---|---|---|
| DE | 29701276 U1 * | 4/1997 | .......... A43B 1/0045 |
| DE | 10 2004 030914 A1 | 1/2006 | |

OTHER PUBLICATIONS

Schelchen, Apr. 30, 1997, machine translation of DE 29701276 (Year: 1997).*

(Continued)

*Primary Examiner* — Chinessa T. Golden
(74) *Attorney, Agent, or Firm* — Morgan, Lewis & Bockius LLP

(57) ABSTRACT

This document discloses antistatic shoe insoles that include a flexible foam layer and antistatic filaments of textile material interspersed throughout the foam layer and extending passed or exposed at the surface of the shoe insole and methods of making such an antistatic shoe insole. The antistatic filaments are needle punched through the foam layer. The antistatic filaments may be any suitable antistatic material blended with any felt fiber such as wool fiber, cotton fiber, polyester fiber, or the like.

14 Claims, 2 Drawing Sheets

Related U.S. Application Data

(60) Provisional application No. 62/870,296, filed on Jul. 3, 2019.

(51) Int. Cl.
*B32B 5/02* (2006.01)
*B32B 5/24* (2006.01)
*B32B 37/12* (2006.01)
*B32B 38/00* (2006.01)

(52) U.S. Cl.
CPC ..... *B32B 2307/202* (2013.01); *B32B 2307/21* (2013.01)

(56) References Cited

U.S. PATENT DOCUMENTS

| | | |
|---|---|---|
| 5,994,245 A | 11/1999 | Marier et al. |
| 2004/0209065 A1 | 10/2004 | Kaplo |
| 2012/0279086 A1 | 11/2012 | Johnson et al. |

OTHER PUBLICATIONS

Extended European Search Report for related European Patent Application No. 20835560.2 dated Sep. 5, 2022, 7 pages.
International Search Report and Written Opinion dated Oct. 9, 2020 for International Patent Application No. PCT/ JS2020/040763, 6 pages.

\* cited by examiner

US 11,793,273 B2

FIBER-FOAM SHOE INSOLES, AND A METHOD OF MANUFACTURING THE SAME

CROSS REFERENCE TO RELATED APPLICATIONS

This application is a continuation of U.S. patent application Ser. No. 16/920,167 filed Jul. 2, 2020, which claims the benefit of U.S. Patent Application Ser. No. 62/870,296, filed Jul. 3, 2019 entitled "ANTISTATIC FIBER-FOAM SHOE INSOLES, AND A METHOD OF MANUFACTURING THE SAME," each of which is incorporated by reference herein in its entirety.

FIELD OF INVENTION

The present invention relates to antistatic shoe insoles and a method for manufacturing antistatic shoe insoles which includes a flexible foam layer and antistatic filaments of textile material substantially uniformly interspersed throughout the foam layer and extending passed or exposed at a surface of the shoe insole.

BACKGROUND

With modern technology, various industrial products need to be produced and/or operated in highly controlled environments and electrostatic charges in those environments can impair the quality and operation of such products. For example, if the charges accumulate to a hazardous level, electrostatic discharge may lower the quality of the products and even cause related industrial hazard, such as an electric shock.

For example, electrostatic discharge events cost the electronics industry billions of dollars annually. These costs are attributable to the requirement for replacing damaged and inoperable equipment that has been affected by electrostatic discharge, as well as the downtime caused by these failures. As a result, electrostatic discharges should be minimized or eliminated whenever possible. One of the more common electrostatic discharge events to occur is when a person simply walks across the surface of the floor. In this example, static electricity is generated when the wearer's shoe soles touch and then separate from the floor while in motion.

This can happen when two dissimilar materials rub together, static electricity arises creating an electrical charge and an imbalance of positive and negative charges. During this rubbing, friction causes positive charges to accumulate on one surface, and negative charges on the other. When the materials are acceptable conductors of electricity, the charges are readily dissipated away. However, in instances where the materials are not acceptable conductors of electricity, an unpleasant, and perhaps dangerous, electrical discharge may occur which results in static electric shock. This static electric shock can negatively impact people and it has the very real potential to severely damage electronic equipment, which is highly susceptible to static electricity. Therefore, different kinds of antistatic equipment and devices were invented including antistatic shoes.

When used in conjunction with electrostatic discharge flooring, antistatic shoe insoles and footwear are a very reliable method of eliminating static charge from personnel and work environments. An example of this is when the electrical charge passes from the wearer's feet, down through the antistatic shoe insole and out of the wearer's shoe to the floor. Rather than electrical charge being discharged into sensitive electronic equipment, the charge which builds up on wearer is instead passed to the floor and dissipated safely. In sum, antistatic shoe insoles and electrostatic discharge footwear are designed to ensure constant drainage of static charges from the body to the floor. For the antistatic and ESD shoes to be effective, both the shoe insoles and the shoes themselves must be ESD rated to provide continuous electric contact of the foot to ground as required by global ESD standards.

However, current antistatic and/or ESD shoes commonly contain shoe insoles that have a thick, single stitch of conductive fiber in the toe section that the wearer can visually see and physically feel on the top surface of the shoe insole. This aforementioned thick, single stitch of conductive fiber of the current antistatic and/or ESD shoe insoles of mention is known to be uncomfortable for the wearer as it can be physically felt directly under-foot as it can come in direct contact with the wearer's toes. The wearers discomfort from wearing the current antistatic and/or ESD shoe insoles of mention is exacerbated by the fact that the shoe wearer often wears their antistatic and/or ESD shoes for many hours at a time in industrial work environments. The prolonged periods of use by the wearer with the current antistatic and/or ESD shoe insoles can greatly increase the chances for blisters on the wearer's feet, as well as increases the chances of foot bruising caused by foot fatigue from excessive use. Thus, there is a continuing need for an improved antistatic and/or ESD shoe insole that the instant invention provides a suitable solution for in terms of both improved comfort to the wearer and in terms of a higher degree of static electric dissipation per capita.

SUMMARY OF INVENTION

The present invention is directed to antistatic shoe insoles which include a flexible foam body with an antistatic layer and antistatic filaments uniformly interspersed throughout the foam body. More specifically, an antistatic insole comprises a flexible foam body with an antistatic felt layer disposed on top of the flexible foam body, where a plurality of filaments of the antistatic felt layer are embedded in the flexible foam body. In some embodiments, the foam body is a polyurethane (PU) foam, but can be any other suitable flexible foam, and the antistatic layer is made of a blend of a non-woven textile with an antistatic additive. The antistatic additive can be composed of conductive fibers to allow for the dissipation of the static electric charge. Further, the insoles have a portion of the filaments extend pass a bottom surface of the shoe insole so as to be exposed exteriorly.

Unlike the current antistatic and/or ESD shoe insoles of mention, the instant invention has a smooth top surface whereby the wearers feet do not contact any stitching or uncomfortable surface changes; essentially, the wearer cannot feel any difference between a standard non-anti-static and/or ESD shoe insole and that of the instant invention under foot, and this greatly improves the comfort of the instant invention for the shoe wearer over the current antistatic and/or ESD shoe insoles. Another advantage of the instant invention over the current antistatic and/or ESD shoe insoles, and that of the prior art, is that the instant invention provides a greater amount of conductive fibers per square centimeter, covering nearly the entire top and bottom surface, and this greatly improves the static dissipation capability over the prior art, thereby making it more efficient and reliable in use, especially over prolonged periods of use.

The present invention, in another aspect, is directed to a process for manufacturing antistatic shoe insoles which include a flexible foam layer and antistatic filaments of a textile material substantially uniformly interspersed throughout the foam layer and extending past or exposed at the surface of the shoe insole. In some embodiments, the method comprises disposing an antistatic felt layer on top of a flexible foam body, where the antistatic felt layer is a blend of a non-woven textile with an antistatic additive, and penetrating filaments of the antistatic layer into the flexible foam body, wherein the filaments are embedded into the foam body and a portion of the filaments extend to a bottom working surface of the foam body as to be exteriorly exposed. The antistatic filaments are optimally needle punched through the foam layer using a needle loom. In the method, a needle loom oscillates a needle board into the foam body with the antistatic felt layer. During the oscillation, the needles grab hold of portions of the antistatic layer and punch filaments of the antistatic felt layer into the foam body such that a portion of the filaments extend to a bottom working surface of the foam body as to be exteriorly exposed. This exposure of the antistatic filaments is what dissipates the electrical static discharge through the shoe wearer's feet, into and out of the sole insole, and safely out to the floor.

The details of one or more embodiments are set forth in the accompanying description below. Other features and advantages will be apparent from the description and from the claims.

DETAILED DESCRIPTION

Figure 1:
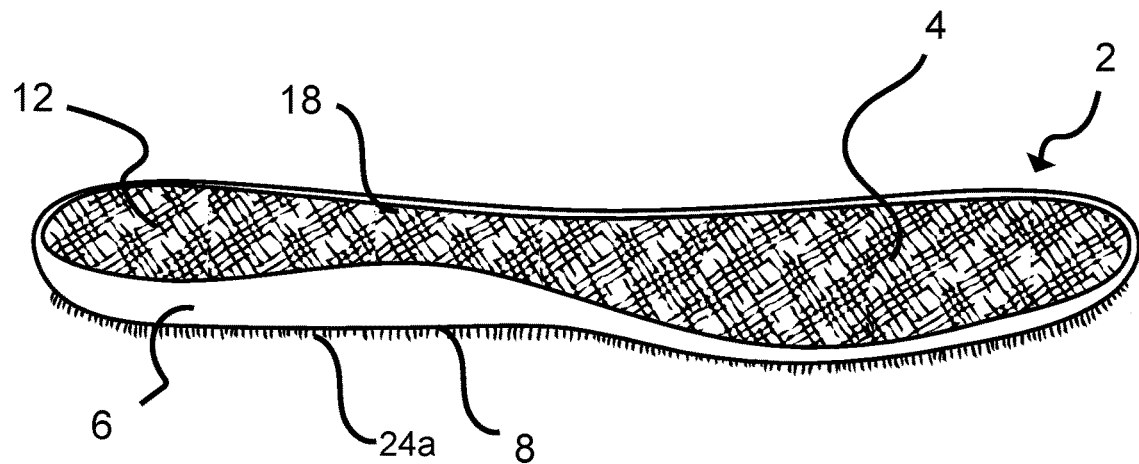
FIG. 1 is a perspective view of an embodiment of an antistatic insole, in accordance with an embodiment of the present invention.

As illustrated in FIG. 1, an antistatic shoe insole 2 includes a main body portion 4 which is comprised of a flexible foam body 16. The body portion 4 has a bottom working surface 8 and a top surface 12. As is known in the art, in some embodiments, the shoe insole 2 can be constructed to be double sided such that the top surface and the bottom working surfaces will appear to be the same. In other embodiments, the top surface and bottom working surface may be different materials to ensure the optimal comfort and design for the shoe wearer. Several non-limiting examples of the top surface of the instant invention can be any conductive woven or non-woven material such as a steel-polyester felt blend or carbon-containing fibers, while several non-limiting examples of the bottom working surface of the instant invention can be comprised of any conductive woven or non-woven material such as silver coated fibers or fine inox wire. In other embodiments, there can be an optional cover layer disposed on top of the antistatic felt layer. For example, any suitable woven, knitted, or non-woven fabric may be optionally used as a cover layer provided that it has adequate antistatic properties. The cover layer can be made of an antibacterial material, a microbial material, a moisture wicking material, or any other suitable material that has inherent antistatic dissipation properties.

In some embodiments, the foam body 6 is comprised of an open-cell polyurethane foam (PU), both other suitable materials such as a closed-cell ethylene vinyl acetate (EVA) foam may also be used. Still further, in certain embodiments, the foam body 6 is comprised of a non-woven fiber batting made from elastomeric polyester or the like that can substitute conventional foams known in the art.

Figure 2:
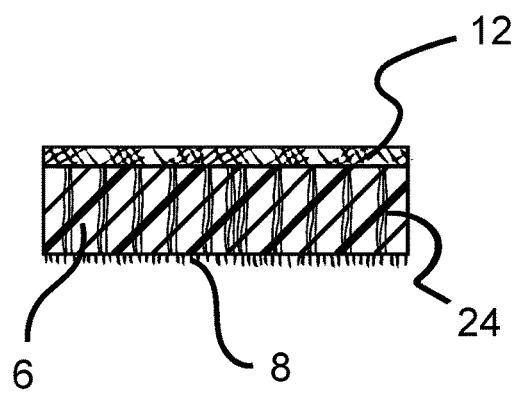
FIG. 2 is a cross-sectional view of the embodiment of FIG. 1.
Figure 3:
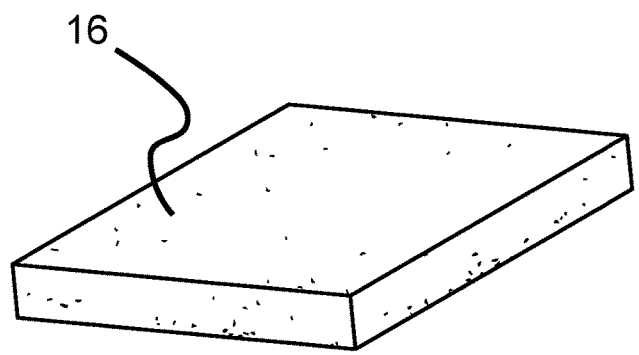
FIG. 3 is an illustration depicting a flexible foam body used in an antistatic insole, in accordance with an embodiment of the present invention.

The antistatic shoe insole 2 further comprises a layer of antistatic felt 18 disposed on top of the foam body 6, as shown in FIGS. 1-2. The antistatic felt layer 18 forms the top surface 12 of the antistatic insole 2. The antistatic layer 18 comprises a blend of a textile fabric with an antistatic additive. For example, in some embodiments, the antistatic layer 18 is made of a blend of steel fibers in a polyester fabric. In other embodiments, depending on the use of the antistatic insole 2, the antistatic layer 18 can comprise a natural textile fabric such as cotton, wool, jute, hemp, and even more advanced natural materials such as polylactic acid, or bionylon blended with the antistatic additive. In the antistatic layer 18 the antistatic additive comprises at least 1% percent by weight. In other embodiments, the additive may range from 1 to 50 percent by weight, and more preferably may range from between 5 to 20 percent by weight. The antistatic additive can be steel fibers, carbon-containing fibers, silver coated fibers, fine inox wire, or any other suitable conductive fiber.

As illustrated in FIG. 2, the insole 2 further includes filaments 24 of the antistatic layer 18 penetrating through the flexible foam body 6. The filaments 24 are embedded into the foam body a given depth such that an end portion 24a of the filaments 24 extend to the bottom working surface 8 of the foam body so as to be exteriorly exposed. This exposure of the antistatic filaments 24 permits electrical static discharge to be dissipated through the shoe wearer's feet, into and out of the sole insole, and safely out to the floor.

In other embodiments, the present invention is directed to a method of manufacturing an antistatic insole. In some embodiments, the method comprises disposing an antistatic felt layer on top of a flexible foam body, where the antistatic felt layer is a blend of a non-woven textile with an antistatic additive, and penetrating a plurality of filaments of the antistatic layer into the flexible foam body, wherein the filaments are embedded into the foam body and a portion of the filaments extend to a bottom working surface of the foam body so as to be exteriorly exposed. FIGS. 3-7 illustrate the various steps in one embodiment of a method of manufacturing an antistatic shoe insole in accordance with the present invention. Initially, a flexible foam body 16 is provided. The foam body 16 may be a sheet of foam while in other instances it may be a continuous sheet of foam that may be fed from a roll or the like.

Preferably, the foam body 16 is comprised of open-cell PU foam but other suitable materials such as closed-cell EVA foam may also be used. The density of the foam 16 will be selected as desired for the particular purpose for which the antistatic shoe insoles 2 may be used.

Figure 4:
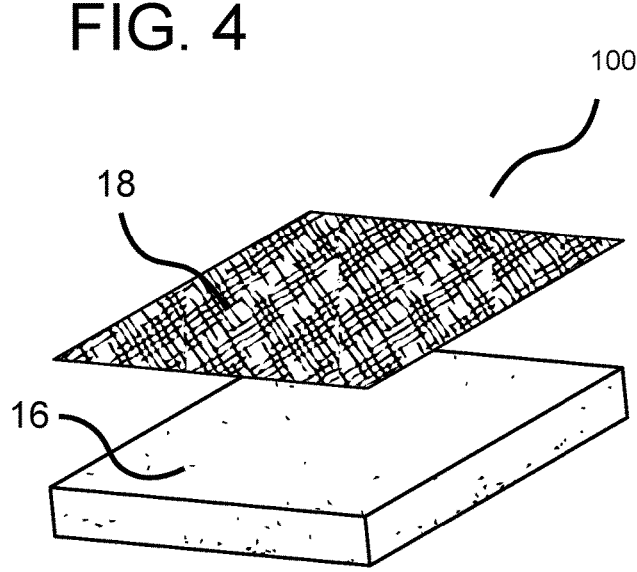
FIG. 4 is an illustration depicting a first step of manufacturing an antistatic fiber-foam insole, in accordance with an embodiment of the present invention.

In a first step, an antistatic layer 18 is disposed on the foam body 16 as shown in FIG. 4. The antistatic layer 18 is a non-woven fabric formed with an antistatic additive (i.e. a conductive material). The antistatic layer 18 comprises a blend of textile fibers with conductive fibers. For example, in some embodiments, the antistatic layer 18 is preferably made from a blend of steel fibers and polyester fibers In other embodiments, depending on the use of the antistatic insole 2, the antistatic layer 18 can comprise a natural textile fabric such as cotton or wool, jute, hemp, and even more advanced natural materials such as polylactic acid, or bio-nylon blended with the antistatic additive. The antistatic additive can be steel fibers, carbon-containing fibers, silver coated fibers, fine inox wire, or any other suitable conductive fiber.

In the antistatic layer 18 the antistatic additive comprises at least 1 percent by weight. In other embodiments, the additive may range from 1 to 50 percent by weight, and more preferably may range from between 5 to 20 percent by weight. The antistatic additive can be steel fibers, carbon-containing fibers, silver coated fibers, fine inox wire, or any other suitable conductive fiber.

Figure 5:
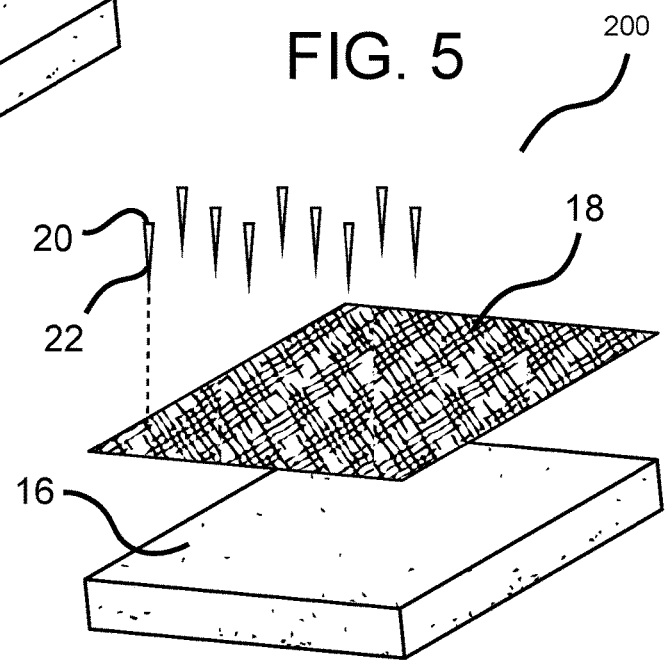
FIG. 5 is an illustration depicting a second step of manufacturing an antistatic fiber-foam insole, in accordance with an embodiment of the present invention.

Like the foam body 16, the antistatic layer may be a sheet, as shown in FIGS. 4 and 5, while in other instances it may be fed from a continuous roll onto the foam 16. In some embodiments, the antistatic layer 18 can be optionally affixed to the foam 16 through the use of an appropriate adhesive to insure a secure bond therebetween. In other embodiments, the antistatic layer 18 may be affixed to the foam body by stitching or any other suitable method.

Figure 6:
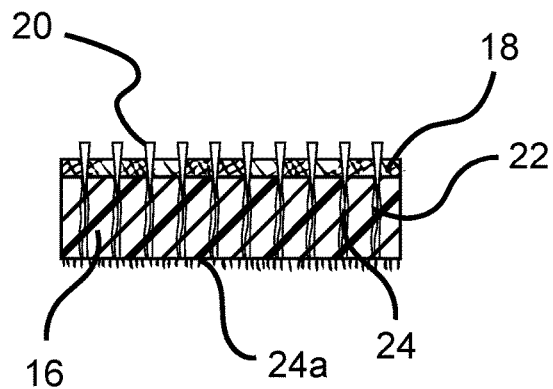
FIG. 6 is illustration depicting a cross-sectional view of an antistatic insole during a second step of manufacturing an antistatic fiber-foam insole, in accordance with an embodiment of the present invention.
Figure 7:
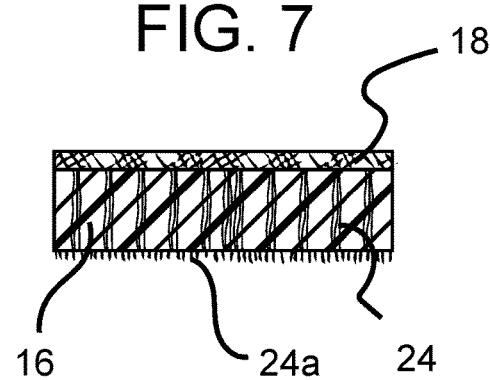
FIG. 7 is cross-sectional view an antistatic insole, in accordance with an embodiment of the present invention.

Following step 100, in step 200, filaments 24 of the antistatic layer 18 are embedded into the foam body 16, as shown in FIGS. 6 and 7. To embed the filaments 24 into the foam body 16, a needle punch or needle looming process is performed. The needle loom works by in-feeding the foam body 16 with the antistatic layer 18 into a needle looming machine. The foam body and the antistatic layer, layered like a sandwich, are fed into the needle loom by an automatic conveyor belt that introduces the two layers to the needle board in oscillation.

With the antistatic layer 18 overlying the foam body 16, the combined structure is then placed under a plurality of needles 20, each of which carries a plurality of downwardly extending barbs 22, seen in FIG. 5. The needles 20 and barbs 22 are used to produce what is commonly referred to as needle punched felt and similar materials, which are known in the art. The needle loom oscillates the needle board into the foam body and antistatic layer sandwich a given thickness. Essentially, the barbs 22 on the needles 20 grab a hold of portions of the antistatic layer 18 and punch filaments 24 of the antistatic layer 18 into the foam body 16. The typical needle penetration is 12 mm to 15 mm but can be adjusted depending on the thickness of the foam body 16. The needles 20 penetrate a sufficient depth to carry the filaments 24 through the combined thickness of the antistatic layer 18 and the foam body 16 to create a mechanical bond between the foam body 16 and antistatic layer 18. Further, the needles penetrate a sufficient depth to such that a plurality of end portions 24a of the filaments extend to the bottom working surface of the foam body so the portions 24a are exteriorly exposed.

As shown in FIG. 6, as the needles 20 are moved downwardly through the antistatic layer 18, the barbs 22 catch a plurality of filaments 24 and draw them downwardly into the foam 16 so that the filaments 24 extend from the top surface 12 as shown in FIG. 2 and through the foam 16 as shown in FIG. 6. Preferably, the ends of the fibers are drawn passed the bottom surface 8 of the foam 16 so as to be exposed at and extend beyond the working surface 8. The needles 20 are then raised. However, the elongated filaments 24 are entangled within and remain in the foam as shown in FIG. 7.

This process can be repeated as many times as desired in order to increase the density of the antistatic filaments 24 relative to the foam body 16. To do so, after the needles 20 are raised, the combined antistatic layer 18 and foam body 16 are shifted within the needle loom and the needles 20 are then again moved downwardly to penetrate additional filaments 24 from the antistatic layer 18 into the foam 16. Thus, the density of the filaments 24 relative to the foam body 16 is a function of the number of needles 20, the speed of movement of the antistatic layer 18 and foam 16 under the needles 20 and the frequency of the up and down strokes of the needles 20.

After the antistatic filaments 24 are needle punched into and through the foam body 16 as shown in FIG. 7, the composite structure can be cut to the desired shoe insole shape, a finishing step 300, to form an antistatic shoe insole. If a single sided antistatic shoe insole is being produced, a cover layer can be secured on top of the antistatic layer 18. If a double-sided antistatic shoe insole is to be produced, the antistatic layers 18 of two antistatic fiber injected sheets will be secured together with adhesive in between them, as is well known in the art. As should be apparent, the final antistatic shoe insoles can be cut into the proper shape before or after they are assembled.

Although a few embodiments have been described in detail above, other modifications are possible. Other embodiments may be within the scope of the following claims.

What is claimed is:

1. A antistatic shoe insole comprising:
   a flexible foam body having a top surface and a bottom working surface; and
   a fabric layer positioned on the top surface of the foam body, the fabric layer including a plurality of filaments forming a mechanical bond between the fabric layer and the flexible foam body and extending from the fabric layer and through the flexible foam body, and wherein a portion of the plurality of filaments of the fabric layer extend to the bottom working surface of the foam body and are exposed exteriorly through the bottom working surface.

2. The shoe insole of claim 1, wherein the flexible foam body is comprised of an open-cell polyurethane foam.

3. The shoe insole of claim 1, wherein the flexible foam body is comprised of a closed-cell ethylene-vinyl acetate foam.

4. The shoe insole of claim 1, wherein the fabric layer is an antistatic layer comprising a blend of a non-woven textile with conductive fibers.

5. The shoe insole of claim 4, wherein the conductive fibers comprise at least 1% by weight of the fabric layer.

6. The shoe insole of claim 4, wherein the conductive fibers range from 5% to 20% by weight of the fabric layer.

7. The shoe insole of claim 1, wherein the fabric layer is an antistatic layer comprising a blend of polyester fabric with a plurality of steel fibers.

8. The shoe insole of claim 1, wherein at least a portion of the plurality of filaments are entangled within the foam body.

9. The shoe insole of claim 1, wherein the fabric layer is stitched to the flexible foam body.

10. The shoe insole of claim 1, wherein the fabric layer includes a natural textile fabric.

11. The shoe insole of claim 10, wherein the fabric layer is comprised of cotton, wool, jute, hemp, polylactic acid, and/or bionylon.

12. The shoe insole of claim 1, wherein the fabric layer includes a felt material.

13. The shoe insole of claim 1, wherein the fabric layer is configured to be positioned between a user's foot and the flexible foam body when the shoe insole is worn by the user.

14. The shoe insole of claim 1, wherein there is no adhesive coupling the fabric layer to the flexible foam body.

* * * * *